United States Patent [19]

Netting

[11] 4,380,459

[45] Apr. 19, 1983

[54] METHOD FOR REDUCING THE AMOUNT OF COAL DUST IN THE ENVIRONMENT SURROUNDING COAL MINING

[75] Inventor: David I. Netting, Springfield, Pa.

[73] Assignee: Atlantic Richfield Company, Los Angeles, Calif.

[21] Appl. No.: 308,222

[22] Filed: Oct. 5, 1981

[51] Int. Cl.$^3$ .................. B01D 47/04; E21C 7/06
[52] U.S. Cl. ........................... 55/87; 299/12; 252/174.17; 252/DIG. 2; 55/385 D
[58] Field of Search ................ 55/87, 385 D; 261/DIG. 26; 252/3, 6.5, 8.05, 60, 174.17, DIG. 2; 299/12

[56] References Cited

U.S. PATENT DOCUMENTS

| | | | |
|---|---|---|---|
| 2,529,211 | 11/1950 | Bosse et al. | 252/6.5 |
| 2,835,330 | 5/1958 | Bauer | 252/6.5 |
| 2,990,380 | 6/1961 | Auerbach et al. | 261/DIG. 26 |
| 3,186,943 | 6/1965 | Barthauer | 55/87 |
| 3,337,463 | 8/1967 | Schmolka | 252/174.17 |
| 3,667,687 | 6/1972 | Rivking | 261/DIG. 26 |
| 4,060,132 | 11/1977 | Chiesa, Jr. | 252/8.05 |
| 4,113,638 | 9/1978 | Taylor | 252/60 |
| 4,237,182 | 12/1980 | Fulmer et al. | 252/3 |

OTHER PUBLICATIONS

Chironis, Nicholas P., Editor, Coal Age, Tailor-Made foam Attracts Consumes Coal Dust Particles, Apr. 1972, pp. 105–108.

*Primary Examiner*—David L. Lacey

[57] ABSTRACT

Coal dust laden air is treated with an aqueous foam of controlled durability and controlled penetrability so that a very high proportion of the particles in the air, including very small particles, are captured by the foam and drained into the liquid resulting from the collapse of the foam. The foam has a propensity to collapse during a brief period, thus forming drainage liquid. The volume of drainage liquid five minutes after foam generation provides a measure of the controlled durability of the foam. The usefulness of the foam is also affected by the rate at which the liquid resulting from foam collapse is absorbed into absorbtive materials, which rate should desirably be slower than the absorption rate of water. The precursor for the foam is a very dilute aqueous solution containing a surfactant plus a synthetic gum in a concentration from about 15 percent to about 45 percent of the weight of the surfactant. An appropriate mixture of sodium salts of alkylated benzene sulfonic acids is an effective surfactant which can be combined with about 35 percent of sodium carboxymethylcellulose having a substitution range from about 0.38 to about 0.48 and a sodium content near 5 percent plus or minus 0.5 percent which type of sodium carbomethoxycellulose is marketed as 7H-4 type of cellulose gum. Such gum has a viscosity of about 3,500 centipose plus or minus 1,000 centipoise when dispersed as a 1 percent solution in water.

3 Claims, No Drawings

METHOD FOR REDUCING THE AMOUNT OF COAL DUST IN THE ENVIRONMENT SURROUNDING COAL MINING

FIELD OF INVENTION

This invention relates to the removal of both large and small dust particles from an air stream by capturing such particles in a predominately aqueous media. Small dust particles sometimes escape through some air washing systems. Although related to the washing of air for dust removal, the use of collapsible foam captures a higher percentage of the dust particles, particularly those of smaller size. Particular embodiments of the invention feature the use of collapsible foam for capturing dust particles in a dust generating zone such as at the crusher of a coal mine.

PRIOR ART

Air streams have been washed to remove dust over a long period of time. Aqueous sprays have been employed for suppressing dust in dust-generating zones such as coal crushers.

A collapsible aqueous foam can be directed toward the dust-generating zone of a coal crusher for decreasing the amount of dust escaping into the atmosphere. As the foam collapses, the dust tends to settle onto the lumps of coal. An article by N. P. Chironis at pp 105–108 of the April 1972 issue of Coal Age magazine describes the use of aqueous foams for decreasing the amounts of dust entrained in the air near coal processing zones. Aqueous foams usually contain surfactants. Taylor U.S. Pat. No. 4,113,638 describes foaming agents for cellular gypsum.

Because the chemicals employed in generating the foam are generally consumed and shipped from the mine along with the coal, there has been a reluctance on the part of mine operators to spend large amounts of money for the equipment and chemicals involved in the use of aqueous foams for dust suppression in coal mines. There has been a continuing effort to develop more suitable foam useful in minimizing dust generated by mining operations.

SUMMARY OF THE INVENTION

In accordance with the present invention, dust particles are removed from air by capture by a collapsible aqueous foam having a controlled instability such that less than all of the potential drainage liquid has drained in five minutes after foam generation, said collapsible foam consisting essentially of water, a minor amount of surfactant and a concentration of synthetic gum which is within the range from about 20 percent to about 45 percent of the concentration of the surfactant.

The nature of the invention is further clarified by reference to a plurality of test procedures, controls, and examples.

FOAM TESTING PROCEDURE

An aqueous solution containing about 0.06 percent modifiers was employed. A mixer of the type employed in preparing malted milk was used to whip air into the precursor. A model 936CP Hamilton Beach mixer had a stainless steel cup, into which 160 ml of precursor was poured. Using a butterfly agitator, the air is whipped into the precursor for 2 minutes, and the resulting foam is poured into a 1,000 ml graduated cylinder. A spatula is employed to minimize the loss attributable to the transfer from the cup to the graduated cylinder. The initial volume of foam is generally within the range from about 200 to about 900 ml. The unit foam ratio is the ratio of volume of foam generated to volume of precursor liquid. If 160 ml of foam yield 800 ml of foam, the unit foam ratio is 5. Because the foam is designed to collapse some liquid forms at the bottom of the graduated cylinder. Such collapse is complete when the drained liquid is 159 ml (assuming about 1 ml mechanical loses in transferring from the mixing cup to the graduated cylinder). The amount of drained liquid at the end of five minutes provides a measure of the extent to which the foam has collapsed. This volume of drained liquid after five minutes is often within the range from 20 to 100 ml.

Other procedures can be used to convert 160 ml of precursor liquid into foam, followed by two measurements, the initial foam volume and the five minute drainage volume.

The absorptivity of the precursor is measured by determining the time needed for a controlled amount of precursor liquid to be absorbed into stirred granules of coal. The coal is screened to provide a fraction of $-50+200$ mesh coal. A paste is prepared by stirring vigorously for 15 seconds a mixture of 5 g of said $-50+100$ mesh coal and 3.5 ml of precursor liquid. The paste is hand mixed until all of the liquid is sorbed into the coal, and sorption time is measured. It is because the surfactant is needed to wet some varieties of coal that pastes sometimes cannot be formed using tap water and coal.

EXAMPLE 1

A dust suppression system features the use of an air compressor, a foam-generating nozzle, and a source supplying a precursor liquid. The compressed air and precursor liquid are pumped to the foam-generating nozzle at rates controlled to provide an aqueous foam having a brief durability sufficient to have less than 100 ml drainage in five minutes. The foam nozzle features a conical shell surrounding a conical expansion zone. A series of appropriate beds of foraminous materials such as steel wool, wire mesh, and glass beads are positioned along the path through said expansion zone, so that the foam volume is several times the liquid volume. The dust suppression system can use substantially the same type of nozzles and compressed air systems which sometimes have been employed in preparing stable foam for use in cellular concrete and related products.

The thus generated foam is directed to the zone of dust capture, which oftentimes is also the zone of dust generation. In laboratory tests, a milling head, such as would be used in a machine shop for cutting metal, is employed to cut a block of coal, thus generating dust. The zone of such milling action is deemed a dust generating zone and is enveloped by the foam flowing from the foam-generating nozzle. The foam has only a relatively short life so that more than 15 ml of drainage is measurable after 5 minutes. Although the foam collapses within a relatively short time, the drainage from foam generated from 160 ml of precursor liquid must be less than 100 ml to avoid too rapid a collapse rate. The foam collapses at a rate corresponding to the supply rate, so that the inventory of foam in the dust-capturing zone is that which corresponds to a few minutes supply from the nozzle.

The air near the cutter which is milling small particles of coal from the block is conspicuously colored when no foam is employed. When the milling is conducted under a blanket of foam, the nearby air looks quite clear, giving the visual impression of complete suppression of dust. The use of compressed air at a very high pressure (e.g. 120 psig) and the foam-generating nozzle appears to be the practical solution for continuous suppression of dust in an industrial environment. However, the use of such a nozzle complicates the testing of a series of different compositions as the precursor for the foam.

EXAMPLE 2

For certain laboratory experiments, it is feasible to generate foam by whipping air into the precursor liquid in a container such as a cup, following a procedure similar to that employed in the conventional stirring of cream to prepare whipped cream. Mixers of the type used in preparing a milk-shake can be equipped with butterfly agitators and used in the laboratory for whipping air into an aqueous precursor liquid to prepare a batch of foam. In evaluating different precursor liquids, batch foaming by whipping has advantages over the continuous use of a foam nozzle.

Formulations of precursor liquids can be evaluated using concentrations differing from those contemplated for commercial use.

The ease with which coal is wetted varies significantly, but aqueous solutions of surfactants generally will wet even those coals deemed to be relatively hydrophobic. After being wetted, significant amounts of water can be sorbed into coal. A block of coal can appear at one moment to have a film of water, and a moment later appear to be dry because water is sorbed into the coal so rapidly. Very viscous aqueous systems are not significantly sorbed into coal. The rate of sorption for an aqueous solution is measured by a test in which a mixture of coal granules and water is stirred until the water is sorbed into the coal, at which time the stirring requires the same energy as for stirring dry granules, significantly greater than for the stirring of the coal and water mixture. The time required to achieve such greater resistance to stirrability is measured as the "sorption time." Coal is crushed and sieved to provide a fraction fully retained on a 200 mesh screen, but all passing through a 50 mesh screen. A 5 g sample of crushed coal is mixed with 3.5 ml of the aqueous solution to be tested. The stirring is initially easy, because water lubricates the particles, but becomes increasingly difficult as water is sorbed into the interior of particles, and the completion of sorption is recognizable by the sudden rapid increase in power needed to stir the granules.

Because many factors affect the variations in the rate at which various foams collapse, care must be exercised in choosing the dimensions for measuring the rate of foam collapse in order to correlate with practical differences in the usefulness of foams. By measuring the volume of liquid draining from the foam collapse five minutes after removal from the whipping device, the collapsibility data correlate with data relating to pragmatic usefulness of the foams as dust suppressors. From the foam generated by 160 ml of precursor liquid, the 5 minute drainage should be from about 20 to about 100 ml.

A sample of 160 ml of the precursor liquid is whipped in a cup to create a foam, which is poured into a 1000 ml graduated cylinder. The peak volume of foam is noted, and its rate of collapse during the first five minutes is measured by noting the volume of liquid derived from such collapse. Separately a 3.5 ml sample of the precursor liquid is mixed with 5 ml of −50+200 mesh crushed coal and the resulting paste is stirred until the liquid is fully sorbed into the coal granules. The sudden increase in power for such stirring at the time of the transformation from paste to a bed of coal granules provides a measure for the sorption time.

A kilogram batch of concentrate is prepared by mixing 884 g of water, 100 g of type 45DS of Ultrawet brand surfactant (45 percent active ingredients, 55 percent water) available from ARCO Chemical Company, Philadelphia, Pennsylvania, plus 15.6 g of type 7H4 Hercules brand of cellulosic gum (i.e. sodium carboxy methyl cellulose). A sample of such concentrate is diluted with 19 parts of water to prepare a precursor. Data relating to the formulation are:

|  | Active Ingredient Percentage | Concentrate Components | Concentrate Overall | Precursor |
|---|---|---|---|---|
| Surfactant | 45 | 14 | 5.2% | .05% |
| Water | 55 |  |  |  |
| Gum | 100 | 3 | 1.2% | .01% |
| Mixture |  |  |  |  |
| Solids |  |  | 6.4% | .06% |
| Water |  |  | 93.6% | 99.94% |

The precursor consists of about 99.94 percent water containing about 0.06 percent solids comprising about 0.05 percent surfactant and about 0.01 percent cellulosic gum.

Control precursor A consists of 99.95 percent water and 0.05 percent solids from 45DS Ultrawet brand surfactant. The precursor of Example 2 contains, in addition to said 0.05 percent Ultrawet solids, 0.01 percent sodium carboxy methyl cellulose, the 7H4 type of cellulosic gum, that is 20 percent of the concentrate of the surfactant. As explained in Taylor U.S. Pat. No. 4,113,638, the surfactant used for foaming an aqueous solution may be a mixture of salts of alkylated benzene sulfonic acids. Such surfactant desirably is a mixture comprising: (a) about 50 percent to 95 percent by weight of a first component which is a neutralized alkaryl sulfonic acid having an average of about 10 to 14 alkyl carbon atoms; and (b) about 5 percent to 50 percent by weight of a second component which is a neutralized alkyl benzene sulfonic acid having an average alkyl carbon content of about 4.5 to 8 atoms per molecule, at least 50 percent being dipropyl benzene sulfonic acid, said sulfonic acid being neutralized to form salts of sodium, potassium, ammonia, lower alkanolamines, and mixtures thereof.

The beneficial effect of the cellulosic gum is shown in Table I.

TABLE I

|  | Control A | Example 2 |
|---|---|---|
| Ultrawet solids percentage by weight | .05 | .05 |
| Cellulosic gum 7H4 | none | .01 |
| Foam volume ml | 800. | 770. |
| Liquid drainage in 5 minutes, ml | 38. | 28. |
| Sorption time in seconds | 276. | 330. |

Thus the cellulosic gum significantly increases (about 20 percent) the sorption time, thus decreasing the likelihood of dust entering the atmosphere shortly after the crushed coal leaves the crusher. Although the cellulosic gum is included in the precursor liquid primarily to increase the sorption time, the Example 2 precursor liquid has the further advantage of providing a more stable foam which collapses at a slower rate, but both the Control and Example 2 formulation exemplify foams having acceptable drainage qualities. The stability-collapsibility of the foam should be such that the drainage from the foam generated from 160 ml of precursor should be within the range from 20 to 100 ml in 5 minutes.

EXAMPLES 3–8

Various other synthetic gums are employed in precursor liquids containing 0.05 percent solids from Ultrawet and 0.01 percent synthetic gum, and the sorption times and foam drainage are measured, as shown in Table II.

TABLE II

| Control or Example | Synethic Gum | Foam Drainage ml | Sorption Time secs |
|---|---|---|---|
| A | None | 38 | 276 |
| 3 | CMC | 28 | 354 |
| 4 | U-CARE JR-125 | 36 | 595 |
| 5 | Klucel-H | 33 | 384 |
| 6 | Polyox-WSR-301 | 30 | 344 |
| 7 | Carbowax 4000 | 41 | 353 |
| 8 | Carbopol | 40 | 537 |

The CMC of Example 3 is a carboxymethyl cellulose. The U-CARE JR-125 of Example 4 is a cationic cellulosic resin. The Klucel of Example 5 is a hydroxy propyl cellulose. The Polyox-WSR-301 of Example 6 is a polyethylene oxide resin. The Carbowax 4000 of Example 7 is a polyethylene glycol resin. The Carbopol of Example 8 is an acrylic acid polymer.

By a series of tests, it is established that the concentration of the synthetic gum should be within the range from about 20 percent to about 45 percent of the solute concentration of surfactant. It was also established that the rate of collapse of the foam should be such that the foam-generated from 160 ml of precursor liquid must provide at least 20, but not more than 100 ml of drainage during the first 5 minutes after foam generation.

EXAMPLE 9–12

Using 20 parts of 7H4 Hercules brand of cellulosic gum per 100 parts of active surfactant, several air cleaning precursor compositions featuring different surfactants were prepared using 0.05 percent surfactant, 0.01 percent cellulosic gum, and 99.94 percent water and evaluated to produce the following data:

| Control or Example | Surfactant | Foam Volume ml | 5 Minute Foam Drainage ml |
|---|---|---|---|
| 9 | Witcolate 1276 | 880 | 65 |
| 10 | Steal KA 460 | 720 | 58 |
| 11 | Neodol 25-3A | 695 | 51 |
| 2 | Ultrawet 45DS | 770 | 28 |

A temporary foam having sufficient stability that a 160 ml sample of precursor (containing about 0.05 percent surfactant about 0.01 percent gum, and about 99.94 percent water) can be whipped into a foam which collapses rapidly enough to provide a drainage from 20 to 100 ml within 5 minutes after foam generation. By a series of tests it is established that many varieties of surfactants can be used, in combination with a synthetic gum, and are useful in the cleaning of air by capturing dust particles in foam. Although names and suppliers can be provided for a few surfactants, those skilled in the art can recognize that certain other surfactants are appropriately used in the present invention.

The Wicolate 1276 is an alcohol ether sulfate surfactant available from Witco Chemical Co. The Steal KA 460 is an ammonical salt of an alkyl ether sulfate available from the Stepan Chemical Co. The Neodol 25-3A surfactant is available from the Shell Chemical Co.

EXAMPLE 13

An air-conditioning system features a zone in which a mixture of fresh and recirculated air is directed through a series of water sprays to remove dust from the air, followed by a dehumifification zone. The water collected from the sprays is collected, passed through filters, and recirculated. The space occupied by the air-washing system is costly, and an effort is made to minutarize the dust entraining zone while still treating air for dust removal at the same rate.

A foam nozzle generates foam using the precursor liquid of Example 2. Such foam collapses with moderate rapidity so that the foam generated from 160 ml of precursor liquid has a drainage of from about 20 to 100 ml within 5 minutes. The liquid collecting under the foam (i.e. the drainage liquid) is directed through a filtration system and recirculated back to the nozzle for generating more foam. The air supply (scheduled to be cleaned) is distributed as pulsating streams to a series of jets directed upwardly at the interface of the foam and draining liquid. Intermittent pulses of air from said jets are converted to large bubbles, which migrate upwardly through the foam to the zone above the foam, from where the air flows to the dehumidification zone. Entrained dust is removed from the air by such upward passage of large bubbles through even a foot of foam more effectively than by conventional washing by passage through several yards of a water spray zone. Although the speed of passage through the foam is slower than through the spray zone, the distance of passage through the foam is so much less than through the spray zone that the total volume of apparatus for dust removal by foam is less than for the spray system. The rental value of the thus liberated space pays for the marginal costs connected with air compressor operation, and related costs of foam suppression of dust. Using laboratory testing equipment for the measurement of residual dust in the cleaned air, the thus foam-cleaned air has smaller amounts of residual dust than the spray-cleaned air. The foam is particularly effective in removing pollen, cigarette smoke, and similar irritants which are sometimes incompletely removed by spray washing systems.

The invention was developed primarily to combat the potentiality of coal dust in industrial and mining environments. Having established that the controlled concentration of synthetic gum improves the dust suppressing propensities of the foam in coal mines, there are reasons to believe that the precursor liquids developed for the present dust suppression system could have utility other than in suppressing coal dust.

Various modifications of the invention are possible without departing from the scope of the appended claims.

The invention claimed is:

1. In a method of reducing the amount of coal dust in the environment surrounding coal mining, cutting and handling operations by applying a layer of foam developed from an aqueous solution containing a foam generating agent to the surface of the coal, the improvement comprising using as the foam generating agent a mixture comprised of a surfactant and a high molecular weight synthetic gum, said synthetic gum being present in said mixture at a concentration of about 15 to 45 percent based on the total weight of surfactant and said foam generating agent being present in the aqueous solution at a concentration of about 0.01 to about 1 percent based on the total weight of the aqueous solution.

2. The method of claim 1 in which the surfactant is a sodium salt of an alkylated benzene sulfonic acid.

3. The method of claim 1 in which the surfactant comprises:
   (a) about 50 to 95 percent by weight of a first component which is a neutralized alkylaryl sulfonic acid having an average of about 10 to 14 alkyl carbon atoms, and
   (b) about 5 to 50 percent by weight of a second component which is a neutralized alkyl benzene sulfonic acid having an average alkyl carbon content of about 4.5 to 8 atoms per molecule, at least 50 percent being dipropyl benzene sulfonic acid,
   said sulfonic acids being neutralized to form salts of sodium, potassium, ammonia, lower alkanolamines, or mixtures thereof.

* * * * *